United States Patent [19]

Ellson

[11] 4,186,282
[45] Jan. 29, 1980

[54] METHOD AND APPARATUS FOR MEASURING TELEPHONE LINE CHARACTERISTICS

[75] Inventor: John C. Ellson, Kanata, Canada

[73] Assignee: Northern Telecom Limited, Montreal, Canada

[21] Appl. No.: 945,246

[22] Filed: Sep. 25, 1978

[51] Int. Cl.² ............................................. H04B 3/46
[52] U.S. Cl. ................................ 179/175.3 R; 324/62
[58] Field of Search ..................... 179/175.3 R, 175; 324/51, 62 R

[56] References Cited
U.S. PATENT DOCUMENTS 4,028,507  6/1977  Hoppough ................... 179/175.3 R

*Primary Examiner*—Thomas A. Robinson
*Attorney, Agent, or Firm*—John E. Mowle

[57] ABSTRACT

A method and apparatus for deriving thirteen distinct parameters of a telephone line from current and charge flow measurements on each side of the line, taken during only three successive voltage states applied to both sides thereof through known tip and ring resistors. The derivations enable calculation of any spurious a-c voltages, d-c voltages, leakage resistances, and line capacitances between tip and ground, ring and ground, and tip and ring, as well as the frequency of the spurious a-c voltages.

5 Claims, 4 Drawing Figures

METHOD AND APPARATUS FOR MEASURING TELEPHONE LINE CHARACTERISTICS

This invention relates to a method and apparatus for measuring a telephone line and more particularly to one for deriving thirteen distinct parameters from the resultant tip and ring current and charge flow monitored during three successive states of applied voltage.

BACKGROUND OF THE INVENTION

During the operation of a telephone system, it is often necessary to test the conditions of a telephone line, particularly those referred to as subscriber loops which connect terminal sets to a central office. In the past, this has been accomplished by connecting various configurations of test equipment to the line to separately determine each of the wanted parameters. An extensive analysis would involve measuring at least thirteen separate parameters including any spurious a-c voltage, d-c voltage, leakage resistance and line capacitance between the tip and ground, ring and ground, and tip and ring of the subscriber's loop, as well as the frequency of the spurious a-c voltage. It will be readily apparent that determining each of these parameters separately in order to evaluate the state of the subscriber loop was a long and tedious operation.

Richard Scott Hoppough's U.S. Pat. No. 4,028,507 issued June 7, 1977, discloses an improved apparatus for measuring the various parameters, which entails forcing the tip and ring to several different sets of potentials with relation to ground, and then measuring the resultant currents flowing therethrough. From these measurements, the various parameters can then be calculated. However with this arrangement separate sets of d-c and a-c voltages must be applied to measure the respective leakage resistances and the line reactances (primarily capacitive). In addition, filters are required to reject any spurious a-c signals on the line during the a-c measurements.

STATEMENT OF THE INVENTION

It has been found that by connecting only three successive d-c voltage states to the line through known tip and ring resistors (rather than directly to the line) and monitoring the resultant transient charge and steady state current therethrough, sufficient information can be obtained to derive the thirteen different parameters of the subscriber loop detailed above, thereby eliminating the separate application of a-c signals for the reactance tests. In a typical application this can be achieved in a period less than three seconds, the majority of the time being required for the line to settle (in order to measure the transient charge) when the voltage state on the line is altered. Thus the measurement time is directly related to the leakage resistance and the capacitance of the loop.

In accordance with the present invention there is provided a test set for measuring a telephone line having tip and ring leads, which comprises means for separately measuring during a first state, spurious currents flowing from tip to ground through a first reference resistor, and ring to ground through a second reference resistor. During a second state, the test set includes means for measuring the transient charge and the steady state current flowing through the first and second resistors when connected in series with first sources of d-c voltage between tip and ground, and ring and ground respectively. During a third state, the test set includes means for measuring the transient charge and the steady state current flowing through the first and second resistors when connected in series with second sources of d-c voltage between tip and ground, and ring and ground respectively, the second sources having a different voltage ratio than the first sources.

In a particular embodiment both sides of the loop are grounded through the reference resistors for measurement of the spurious currents. A low d-c voltage is applied to both sides of the loop through the resistors during the second state, and in the third state the low voltage is removed from one side. Each state results in two values: a transient charge flow as a result of the change of state, and a steady state current flow after the transient. The currents give the spurious voltages and leakage resistances which may be present, while the transient charges give the capacitance values.

The invention also encompasses a method of measuring these parameters which includes individually measuring and recording the spurious currents flowing through individual reference resistors connected from each side of the line to ground, then individually measuring and recording the transient charge and the steady state current flowing through the individual reference resistors connected in series with first sources of d-c voltage from each side of the line to ground, and then individually measuring and recording the transient charge and the steady state current flowing through the individual reference resistors connected in series with second sources of voltage from each side of the line to ground, the second sources having a different voltage ratio than the first sources; and thereafter calculating the various parameters directly from the recorded measurements.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
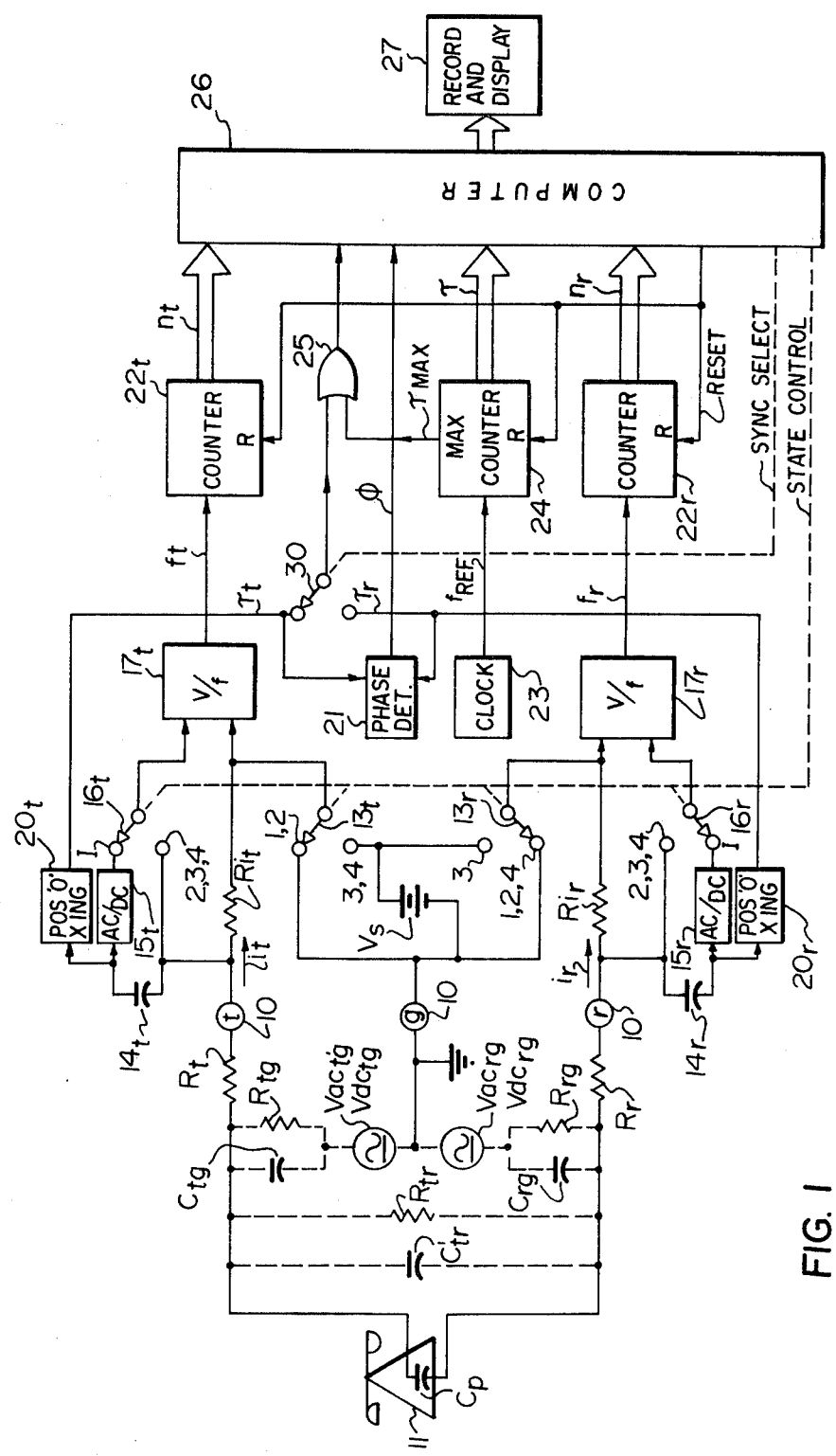
FIG. 1 is a block and schematic circuit diagram of a telephone line connected to a test set for measuring the line.

FIG. 1 illustrates the test set connected to the tip (t) and ring (r) of a telephone line 10 (often referred to as a subscriber loop) which is terminated in a conventional telephone set 11. When the set 11 is on-hook, it generally appears as about a 0.45 $\mu$F capacitor $C_P$ across the line 10, which is primarily contributed by a d-c isolating capacitor in series with a ringer (not shown) in the set 11. Shown in dotted form is the leakage resistance $R_{tg}$ and line capacitance $C_{tg}$ in series with spurious a-c and d-c voltages $Vac_{tg}$ and $Vdc_{tg}$ from tip (t) to ground (g); leakage resistance $R_{rg}$ and line capacitor $C_{rg}$ in series with spurious a-c and d-c voltages $Vac_{rg}$ and from $Vdc_{rg}$ from ring (r) to ground (g); and leakage resistance $R_{tr}$ and line capacitance $C_{tr}'$ from tip (t) and ring (r) of the line 10. Since the capacitor $C_p$ is in shunt with the capacitance $C_{tr}'$ the total tip to ring capacitance will equal $C_{tr}=C_p+C_{tr}'$. Illustrated in lumped form is the series resistance $R_t$ and $R_r$ of the line 10. Normally this resistance is small ($<3000\Omega$) compared to any leakage resistance ($>>50000\Omega$) of the line 10 and consequently has little effect on the resistance measurements. Also the line resistance does not affect the accuracy of the capacitance measurements, since these calculations which take place only after the transient voltages have subsided, are based on the total charge flow and not on the charge flow for a preselected period of time.

Figure 2:
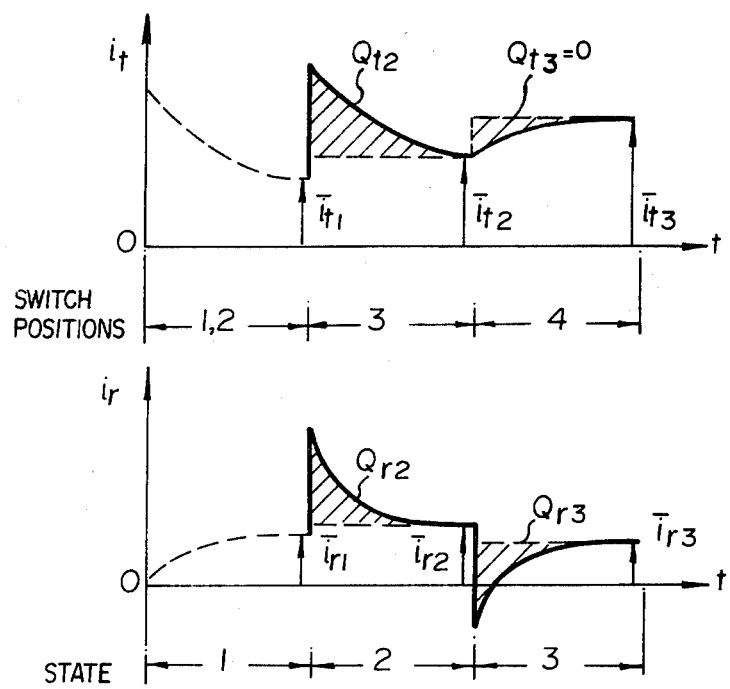
FIG. 2 illustrates typical current waveforms developed across the reference resistors during the three applied states, when no spurious a-c signals are present.
Figure 3:
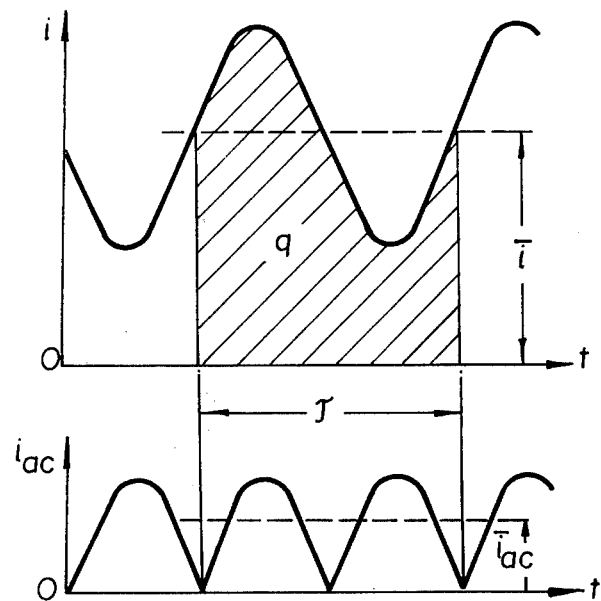
FIG. 3 illustrates a typical steady-state current on either the tip or ring lead when a spurious a-c component is present, and the a-c component of that current after having been rectified.
Figure 4:
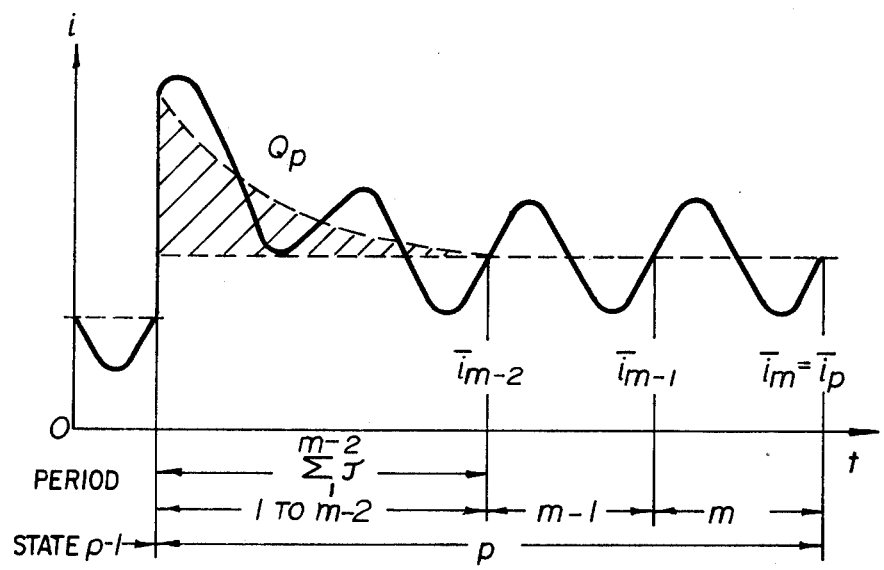
FIG. 4 illustrates the transient current flow when a step function d-c voltage is applied to one side of the line during the presence of a spurious a-c component.

In the following description of the test set, corresponding elements and waveforms for both t and r will be identified by the same reference numeral or character followed by the distinguishing reference character t or r. However, only the reference numeral will be referred to except where it is necessary to distinguish between the two elements. Also, the location in FIG. 1 of the waveforms illustrated in FIGS. 2, 3 and 4 is indicated by corresponding reference characters. In addition, all switches which are illustrative only, are connected concurrently to their respective contacts bearing identical contact numbers, under control of timing control circuitry, as will be explained in greater detail hereinafter.

Both t and r of the line 10 are coupled through input reference resistors $Ri_t$ and $Ri_r$ (each typically $100K\Omega$) to switches 13 which control the three different voltage states applied to the line 10. During each of the three measurement stages, the current and transient charge flow through the reference resistors $Ri_t$ and $Ri_r$ is obtained indirectly by monitoring the voltage thereacross. The balance of the test set will manifest itself from the following description of its function and operation.

During the initial stage, the resistors $Ri_t$ and $Ri_r$ are both connected to ground g to enable measurement of any spurious a-c or d-c voltages Vac or Vdc on the line 10. Initially, with all switches in position 1, spurious a-c voltages developed across the resistors $Ri_t$ and $Ri_r$ respectively are coupled through capacitors 14, a-c/d-c converters 15 and switches 16 to respective voltage/frequency converters 17. The use of v/f's 17 permits simply counting (integration techniques for obtaining capacitance measurements. As explained hereinafter, the d-c measurements (yielding spurious d-c voltages $Vdc_{tg}$ and $Vdc_{rg}$, leakage resistances and capacitances) are made with the v/f converters 17 coupled directly to the line 10. The a-c measurements (spurious a-c voltages $Vac_{tg}$ and $Vac_{rg}$) are made by coupling the v/f converters 17 through the d-c blocked a-c/d-c converters 15 to the line 10.

The outputs from the capacitors 14 are also fed to positive zero crossing detectors 20. If there is a detectable spurious a-c component present on the line 10 then the sample period $\tau$ will be that between two positive-going zero crossings of the a-c component. All d-c measurements are synchronized with integral multiples of cycles of the spurious a-c component to give a-c rejection.

The following simplifying assumptions are made about spurious a-c sources:

(1) That any spurious a-c voltage is periodic. If this assumption is not valid, for example if the a-c voltage is broadband white noise, then the meter will still make an attempt to produce a mean a-c voltage reading but will not be able to make any other measurements since synchronization of the sample period will be impossible.

(2) That any spurious a-c voltages on both the tip and ring are due to a single source. Separate sources on tip and ring of similar amplitudes but of differing frequencies will result in a situation similar to the above.

As a result of assumption 2, the loop 10 may be reduced to one of two equivalents for a-c measurement: one where the spurious a-c sources on the tip and ring are in-phase and the other where they are out-of-phase. The phase $\phi$ is detected by comparing the outputs of the positive zero crossing detectors 20 in a phase detector 21. The tip to ring a-c potentials may be calculated:

$$Vac_{tr}=\sqrt{Vac_{tg}^2+Vac_{rg}^2-2\cdot Vac_{tg}\cdot Vac_{rg}\cdot Cos\phi}$$

The outputs from the v/f converters 17 are fed to counters 22 which provide at their output, a frequency count n over a preselected interval as explained hereinafter. In addition an internal 1 MHz clock 23 provides a reference output frequency $f_{ref}$ which is fed to a further counter 24. The counter 24 provides two outputs: (1) a measure of the sample period $\tau$ which is the time between successive zero crossings of the spurious a-c component Vac as detected by one or other of the positive "0" crossing detectors 20, which indirectly controls the resetting of the counter 24; or (2) if no a-c component is present the maximum sample period $\tau_{max}$ which is provided each time the counter 24 is filled. $\tau_{max}$ is selected to be longer than the period of the lowest spurious a-c signal expected to be encountered. Typically $\tau_{max}=100$ msec is used.

Either sample period pulses $\tau_t$, $\tau_r$ or $\tau_{max}$ are coupled by a switch 30 and/or an OR gate 25 to a computer 26 which also receives the counter and phase outputs $n_t$, $n_r$ and $\phi$ as shown in order to perform the various calculations as determined by the formulas given in TABLES I and II at the end of this description.

The switch 30 is initially connected to the output of detector 20t. However, if no spurious a-c signal is detected the information is conveyed to the computer 26 which controls the connection of the switch 30 to the output of detector 20r. This permits a spurious signal on either the tip and/or ring to control the resetting of the counters 22 and 24.

In addition the computer 26 provides the reset signals for the counters 22 and 24 each time a control signal is received from the OR gate 25. The computer 26 also outputs the calculated values to a record and display unit 27, as well as provides control signals to the various switches. Once the measurements for switch positions 1 are completed, the switches 13 and 16 are moved to positions 2 under control of the computer 26 for measurements of any spurious d-c voltages. The switches 13 and 16 are then moved to position 3. Here an internal voltage source $V_s$ (typically $V_s = 50v$) is applied to both t and r through the resistors $Ri_t$ and $Ri_r$ respectively, and another set of d-c voltage measurements is taken as well as the magnitude of the transient charge flowing through the resistors $Ri_t$ and $Ri_r$.

When a steady state condition is reached (as determined by two successive measurements of equal magnitude) the ring r is again connected to ground through resistor $Ri_r$ as indicated by switch positions 4 and a further set of d-c and charge flow measurements is taken. It is to be noted that resistor $Ri_r$ need not necessarily be connected to ground but may be connected to a voltage source of a different magnitude. The important thing is that the ratio of the two voltages applied to the resistors $Ri_t$ and $Ri_r$ be different for positions 3 and 4.

Once this is completed sufficient information has been fed to the computer 26 to initially obtain the derived measurements shown in the TABLES and ultimately the 13 calculated parameters. However only three different voltage states have been applied to the resistors $Ri_t$ and $Ri_r$. In positions 1 and 2, both resistors are connected to ground; during position 3, both resistors are connected to $V_s$; during position 4 $Ri_r$ is again connected to ground while $Ri_t$ continues to be connected to source $V_s$.

The instantaneous output frequency f of the voltage-/frequency converters 17 is proportional to the instantaneous current i through the resistors Ri. The transfer function of the converters 17 is therefore: $f = K \cdot i + f_o$ where K is a gain term and $f_o$ is the output frequency of the converters 17 when $i=0$. Also if t be a measure of time and n be a count of cycles of f, the instantaneous frequency f is then given by $f = dn/dt$. By rearrangement, the current i and the charge flow q can be calculated in terms of n and t as follows:

$$i = (1/k)(dn/dt - f_o)$$

$$q = \int i \, dt = (1/k)[\int dn - f_o \int dt]$$

For a finite measurement sample period $\tau$ the charge flow is given by:

$$q = \int_0^\tau i \, dt = 1/k(N - f_o \tau)$$

The mean value $\bar{i}$ of the current is given by:

$$\bar{i} = 1/\tau \int_0^\tau i \, dt = 1/k(N/\tau - f_o)$$

where $$N = \int_0^\tau dn,$$

i.e. the count accumulated during the period $\tau$.

The frequency $f_s$ of the spurious a-c voltage is then $f_s = 1/\tau$.

FIG. 2 illustrates typical charge flow and steady state currents which flow through the reference resistors $Ri_t$ and $Ri_r$ during the various measurement intervals when a spurious d-c voltage of different magnitude is present on both the tip and ring. If this voltage were not present then the currents $\bar{i}_{t1}$ and $\bar{i}_{r1}$ would be zero during the initial interval when the switches were in positions 1 and 2. The transient charge flow $Q_t$ and $Q_r$ during states 2 and 3 results from the change in voltage applied to both sides of the line 10. This also results in a different steady state current $\bar{i}_t$ and $\bar{i}_r$ during states 2 and 3.

An a-c component resulting from the presence of a spurious a-c voltage on the line 10 is shown superimposed on a steady-state current $\bar{i}$ in FIG. 3. The charge flow q for one cycle of the spurious signal is also indicated. The equivalent current output from the a-c/d-c converter 15 is also illustrated in the bottom portion of FIG. 3.

FIG. 4 illustrates the transient charge that flows following a change of state p-1 to p (e.g. from state 2 to state 3). The transient is considered to be complete when consecutive samples show no detectable mean current change thus: $\bar{i}_{m-1} = \bar{i}_m$. The transient charge flow is as follows:

$$Q = \sum_1^{m-2} q - \bar{i}_{m-1} \cdot \sum_1^{m-2} \tau$$

This is not necessarily the total charge in the capacitance but its value $Q'$ can be readily determined by applying corrections for the leakage resistance as shown in the accompanying TABLES. It should be noted that the change of state is synchronized with the period $\tau$ under control of the computer 26. The leakage resistance values are calculated from the stable, post-transient current values $i_p$ which can be readily derived from the formulas given above.

Initially, the derived measurements shown in TABLES I and II are determined from the information fed to the computer 26 during the respective switch positions. These measurements can then be used to derive the intermediate calculations as shown, as well as the desired 13 calculated parameters which are subsequently fed to the record and display unit 27.

Since the ring lead r is grounded during the third state it will be seen that the resulting voltage is $V_{rg3} = 0 - i_{r3} \cdot Ri_r$. While there is a charge flow $Q_{t3}$ in state 3 (switch position 4), there is no charge flow $Q_{t3}' = 0$ into the unknown capacitors, since the voltage $V_s$ applied to lead t is not changed from that applied during state 2 (switch position 3).

TABLE I

| SWITCH POSITIONS | DERIVED MEASUREMENTS | INTERMEDIATE CALCULATIONS | CALCULATED PARAMETERS |
| --- | --- | --- | --- |
| 1 | $\bar{i}_{ac\,t1}$ | | $Vac_{tg} = \bar{i}_{ac\,t1} \cdot Ri_t$ |
| | $\bar{i}_{ac\,r1}$ | | $Vac_{rg} = \bar{i}_{ac\,r1} \cdot Ri_r$ |
| | $\tau$ | | $Vac_{tr} = \sqrt{Vac_{tg}^2 + Vac_{rg}^2 - 2 \cdot Vac_{tg} \cdot Vac_{rg} \cdot \cos\phi}$ |
| | $\phi$ | | $f_s = 1/\tau$ |
| 2 | $\bar{i}_{t1}$ | | $Vdc_{tg} = \bar{i}_{t1} \cdot Ri_t$ |
| | | | $Vdc_{rg} = \bar{i}_{r1} \cdot Ri_r$ |
| | $\bar{i}_{r1}$ | | $Vdc_{tr} = Vdc_{tg} - Vdc_{rg}$ |

TABLE I-continued

| SWITCH POSITIONS | DERIVED MEASUREMENTS | INTERMEDIATE CALCULATIONS | CALCULATED PARAMETERS |
|---|---|---|---|
| 3 | $\bar{i}_{t2}$ | $I_{t2} = \bar{i}_{t2} - \bar{i}_{t1}$ | |
| | $\bar{i}_{r2}$ | $I_{r2} = \bar{i}_{r2} - \bar{i}_{r1}$ | $R_{tg} = \dfrac{V_{tg2} - V_{tg3} \dfrac{V_{tr2}}{V_{tr3}}}{I_{t2} - I_{t3} \dfrac{V_{tr2}}{V_{tr3}}}$ |
| | $V_s$ | $V_{tg2} = V_2 - I_{t2} \cdot R_{i_t}$ | |
| | (known) | $V_{rg2} = V_2 - I_{r2} \cdot R_{i_r}$ | |
| | | $V_{tr2} = V_{tg2} - V_{rg2}$ | |
| 4 | $\bar{i}_{t3}$ | $I_{t3} = \bar{i}_{t3} - \bar{i}_{t1}$ | $R_{rg} = \dfrac{V_{rg2} - V_{rg3} \dfrac{V_{tr2}}{V_{tr3}}}{I_{r2} - I_{r3} \dfrac{V_{tr2}}{V_{tr3}}}$ |
| | $\bar{i}_{r3}$ | $I_{r3} = \bar{i}_{r3} - \bar{i}_{r1}$ | |
| | | $V_{tg3} = V_s - I_{t3} \cdot R_{i_t}$ | $R_{tr} = \dfrac{V_{tg3} - V_{tg2} \dfrac{V_{rg2}}{V_{rg3}}}{I_{t3} - I_{t2} \dfrac{V_{rg2}}{V_{rg3}}}$ |
| | | $V_{rg3} = 0 - I_{r3} \cdot R_{i_r}$ | |
| | | $V_{tr3} = V_{tg3} - V_{rg3}$ | |

TABLE II

| SWITCH POSITIONS | DERIVED MEASUREMENTS | INTERMEDIATE CALCULATIONS | CALCULATED PARAMETERS |
|---|---|---|---|
| 3 | $Q_{t2}$ | $Q'_{t2} = Q_{t2} \dfrac{V_s}{V_{tg2}}$ | $C_{tg} = \dfrac{Q'_{t2} - Q'_{t3} \dfrac{\Delta V_{tr3}}{V_{tr2}}}{V_{tg2} - V_{tg3} \dfrac{\Delta V_{tr3}}{V_{tr2}}}$ |
| | $Q_{r2}$ | $Q'_{r2} = Q_{r2} \dfrac{V_s}{V_{rg2}}$ | $C_{rg} = \dfrac{Q'_{r2} - Q'_{r3} \dfrac{\Delta V_{tr3}}{V_{tr2}}}{V_{rg2} - V_{rg3} \dfrac{\Delta V_{tr3}}{V_{tr2}}}$ |
| | | $Q'_{t3} = Q_{t3} \dfrac{V_s - V_s}{V_{tg3} - V_{tg2}} = 0$ | |
| 4 | $Q_{t3}$ | $Q'_{t3} = Q_{t3} \dfrac{-V_s}{V_{rg3} - V_{rg2}}$ | $C_{tr} = \dfrac{Q'_{t3} - Q'_{t2} \dfrac{\Delta V_{rg3}}{V_{rg2}}}{V_{tg3} - V_{tg2} \dfrac{\Delta V_{rg3}}{V_{rg2}}}$ |
| | $Q_{r3}$ | $\Delta V_{tr3} = V_{tr3} - V_{tr2}$ | |
| | | $\Delta V_{tg3} = V_{tg3} - V_{tg2}$ | |
| | | $\Delta V_{rg3} = V_{rg3} - V_{rg2}$ | |

What is claimed is:

1. A machine method of measuring the leakage resistances, the capacitances, and the spurious voltages on a telephone line comprising the steps of:
   individually measuring and recording any spurious current flowing through individual reference resistors connected from each side of the line to ground;
   individually measuring and recording the transient charge and the steady state current flowing through the individual reference resistors when connected in series with first sources of d-c voltage from each side of the line to ground;
   individually measuring and recording the transient charge and the steady state current flowing through the individual reference resistors when connected in series with second sources of d-c voltage from each side of the line to ground, the second sources having a different voltage ratio than the first sources; and
   calculating the leakage resistances, the capacitances and the spurious voltages between each side of the line and ground, and between the two sides of the line directly from the recorded measurements.

2. A test set for measuring a telephone line having tip and ring leads to enable calculation of the leakage resistances, the line capacitances and the spurious voltages between tip and ground, ring and ground, and tip and ring directly from the measurements, the test set comprising:
   means for applying three successive d-c voltage states through first and second reference resistors from tip to ground, and ring to ground respectively, the two applied voltages in one state differing from the two applied voltages in the second and third states in at least magnitude and ratio respectively; and
   means for separately measuring the transient charge and the steady state current flowing through the first and second resistors during each of the three states.

3. A test set for measuring a telephone line having tip and ring leads to enable calculation of the leakage resistances, the line capacitances and the spurious voltages between tip and ground, ring and ground, and tip and ring directly from the measurements, the test set comprising:
   means for separately measuring any spurious current which flows from tip to ground through a first reference resistor, and ring to ground through a second reference resistor;
   means for applying first and second d-c voltages through the first and second resistors from tip to ground and ring to ground respectively, and then for separately measuring the transient charge and the steady state current through said resistors; and means for applying third and fourth d-c voltages, having a different ratio than the first and second voltages, through the first and second resistors from tip to ground and ring to ground respectively, and then for separately measuring the transient charge and the steady state current through said resistors.

4. A test set as defined in claim 3 in which three of the four d-c voltages are of the same magnitude.

5. A test set as defined in claim 3 which additionally includes: means for measuring any a-c components in the spurious currents; means for detecting zero crossings of the a-c component in the spurious currents; and means responsive to no detectable change in the mean current between adjacent zero crossings of the a-c component to terminate measurement of the transient charge and to initiate measurement of the steady state current.

* * * * *